Patented May 10, 1938

2,116,866

UNITED STATES PATENT OFFICE 2,116,866

COMPOSITION AND PROCESS FOR THE PRODUCTION OF FERTILIZERS

Walter H. Kniskern, Petersburg, Va., and Charles K. Lawrence, Baldwinsville, N. Y., assignors, by mesne assignments, to The Solvay Process Company, New York, N. Y., a corporation of New York No Drawing. Application December 1, 1936, Serial No. 113,606

9 Claims. (Cl. 71—43)

This invention relates to compositions containing ammonia and a plurality of fertilizer salts at least two of which are ammonium nitrate and sodium nitrate; to processes for the preparation of such compositions; and to the use of these compositions in the production of fertilizers.

The methods for the fixation of atmospheric nitrogen which have gone into extensive commercial use make available large amounts of fixed nitrogen in the form of ammonia for industrial purposes and particularly for the production of fertilizers. The ammonia may be industrially utilized as such or it may, if desired, be neutralized with acids, for example with nitric acid to form ammonium nitrate, which is a valuable fertilizer material. The nitric acid used for ammonium nitrate production may be obtained from fixed nitrogen in the form of ammonia by oxidizing the ammonia and reacting the resulting nitrogen oxides with water. Sodium nitrate may be prepared by reaction of nitric acid so prepared with a sodium salt or by direct absorption of the nitrogen oxides in a solution of sodium carbonate or sodium hydroxide.

The production and marketing of ammonia, either as free ammonia or in combination in the form of ammonium salts, and of sodium nitrate are attended by difficulties and expensive operations. Liquid anhydrous ammonia itself has a relatively high vapor pressure at ordinary temperatures. Accordingly, in order to ship and handle the ammonia in this form, precautions must be taken to prevent losses of ammonia. If the ammonia is shipped in the form of aqua ammonia, a large proportion of the transportation costs go for the transportation of the valueless water. Again, if the ammonia is oxidized and the nitrogen oxides are employed for the production of sodium nitrate, in order to recover the sodium nitrate as a solid salt from the solution obtained in the process for its production, a large amount of water must be evaporated from the solution, which evaporation adds greatly to the cost of the material.

It is frequently desirable to prepare fertilizers containing nitrogen as well as $P_2O_5$ derived from materials such as superphosphate. It has been proposed to prepare such fertilizers by treating a superphosphate with ammonia. When ammonia is added to a superphosphate in relatively large amounts, however, the ammonia tends to cause water and citrate soluble $P_2O_5$ in the superphosphate, both of which are considered available as plant food, to revert to citrate insoluble $P_2O_5$, which is not considered available to plants. This reversion becomes greater as the amount of ammonia added to the superphosphate is increased. There is, therefore, not only a limit to the amount of nitrogen which may be added as free ammonia in treating a superphosphate with ammonia or other ammoniacal material but below this limit it is advantageous in preparing mixed fertilizers containing a given proportion of nitrogen to employ a material containing a high ratio of salt nitrogen to free ammonia nitrogen. The reason for this advantageousness is that the higher the ratio of salt nitrogen to free ammonia nitrogen in the ammoniating composition, the lower will be the amount of ammonia which must be added to produce a fertilizer of a given nitrogen content and therefore the lower will be the reversion occurring.

It is, accordingly, an object of this invention to provide a composition of matter which comprises an ammoniacal solution of nitrogenous fertilizer salts, which has a relatively large ratio of salt nitrogen to basic ammonia in the composition and is particularly suitable for use in treating solid acidic fertilizer materials to form mixed fertilizers.

It is a further object of this invention to provide solutions of this character which have a low vapor pressure and therefore are specially suited to being transported.

Another object of this invention is to provide a process for the production of a mixed fertilizer which may contain a substantial proportion of nitrogen but in which the reversion of soluble phosphate is low, by treating, for example, a monocalcium acid phosphate material such as superphosphate or triple superphosphate, or mixtures containing the same, with an ammoniacal liquid composition which has a relatively large ratio of salt nitrogen to free ammonia nitrogen.

We have discovered that compositions particularly adaptable to being transported and handled, since they remain liquid even at relatively low temperatures, and particularly suitable for use in the preparation of mixed fertilizers by addition thereof to an acidic material, such as superphosphate or triple superphosphate, since they contain relatively high proportions of salt nitrogen to free ammonia nitrogen may be prepared by dissolving both sodium nitrate and ammonium nitrate in an ammoniacal liquid such as anhydrous liquid ammonia or aqua ammonia. The following table shows the compositions of solutions of sodium nitrate and ammonium nitrate in both anhydrous liquid ammonia and in aqua ammonia of about 75%, 50% and 25% strength from which solid phase salts out at the temperatures indicated:

| Salting out temperature, °C. | Composition percent by weight | | | | Ratio (by weight) $\frac{Salt-N}{Free\ NH_3-N}$ |
|---|---|---|---|---|---|
| | $NaNO_3$ | $NH_4NO_3$ | $NH_3$ | $H_2O$ | |
| *Solutions in anhydrous liquid $NH_3$* | | | | | |
| 0 | 0 | 74.6 | 25.4 | 0 | 1.25 |
| 0 | 5.0 | 72.0 | 23.0 | 0 | 1.37 |
| 0 | 56.0 | 0 | 44.0 | 0 | 0.25 |
| −17 | 0 | 71.5 | 28.5 | 0 | 1.06 |
| −17 | 5.0 | 70.0 | 25.0 | 0 | 1.23 |
| *Solutions in about 75% aqua $NH_3$* | | | | | |
| −3 | 0 | 70.2 | 22.8 | 7 | 1.31 |
| −3 | 3.9 | 67.2 | 22.1 | 6.8 | 1.33 |
| −7 | 0 | 68.9 | 23.5 | 7.6 | 1.25 |
| −7 | 3.8 | 66.3 | 22.6 | 7.3 | 1.28 |
| *Solutions in about 50% aqua $NH_3$* | | | | | |
| +5 | 0 | 64.1 | 17.9 | 18.0 | 1.52 |
| +5 | 3.8 | 61.7 | 17.2 | 17.3 | 1.56 |
| +2 | 0 | 63.1 | 18.4 | 18.5 | 1.46 |
| +2 | 3.8 | 60.7 | 17.7 | 17.8 | 1.50 |
| +2 | 36.5 | 0 | 31.7 | 31.8 | 0.23 |
| *Solutions in about 25% aqua $NH_3$* | | | | | |
| 0 | 0 | 54.3 | 11.4 | 34.3 | 2.02 |
| 0 | 5.0 | 52.3 | 10.7 | 32.0 | 2.17 |

As shown by the data in the above table, sodium nitrate is much less soluble in ammoniacal liquids (aqua or liquid anhydrous ammonia) than is ammonia nitrate. Further, since sodium nitrate contains a much smaller proportion of nitrogen than does ammonium nitrate, the solutions of the former salt contain a much lower ratio of salt-nitrogen to free ammonia nitrogen than the solutions of the latter salt. It would be expected that the quantity of ammonium nitrate in a solution containing sodium nitrate would be sufficiently less than the quantity of ammonium nitrate soluble in the absence of sodium nitrate to more than offset the quantity of nitrogen added by the sodium nitrate. It has been found, contrary to this expectation, sodium nitrate may be incorporated with saturated solutions of ammonium nitrate without causing a decrease in the ratio of salt nitrogen to free ammonia nitrogen and, in fact, this ratio may be increased by the addition of the sodium nitrate. In other words, the solubility of the ammonium nitrate does not drop substantially upon the addition of sodium nitrate, so that the ratio of salt nitrogen to free ammonia nitrogen is increased. Furthermore, in some cases the solubility of the ammonium nitrate is increased by the presence of sodium nitrate.

The present invention comprises those compositions containing sodium nitrate and ammonium nitrate dissolved in an ammoniacal liquid in which the sodium nitrate and ammonium nitrate are in proportions which impart to the solution a greater ratio of salt nitrogen to free ammonia nitrogen than is present in a solution of ammonium nitrate in the ammoniacal liquid which salts out a solid phase at the same temperature as the composition salts out. Our preferred compositions are those which are substantially saturated at a temperature between −30° C. and 30° C. with the sodium or ammonium nitrate or with both salts; i. e., compositions which salt out at a temperature between −30° C. and 30° C.

The present invention further comprises solutions of sodium nitrate and ammonium nitrate in an ammoniacal liquid in which the weight of the sodium nitrate is less than 10% of the combined weight of the two salts and which salt out at a temperature between −30° C. and 30° C.

Our preferred compositions are those in which the sodium nitrate and ammonium nitrate are in solution in an aqua ammonia containing 50° to 75% ammonia.

This invention comprises processes of preparing mixed fertilizers in which the solutions above described are added to a solid acidic fertilizer material such as superphosphate, double superphosphate or triple superphosphate. According to a preferred form, the liquid compositions of the present invention are added to a superphosphate material in proportions corresponding to the addition of about one mol. or more free ammonia in the liquid per mol. of water soluble $P_2O_5$ in the superphosphate. In the case of superphosphate, the liquid is added preferably in amount corresponding to the addition of about 23 pounds or more free ammonia per thousand pounds superphosphate.

From the viewpoints of adding relatively large amounts of nitrogen to superphosphate materials without using sufficient free ammonia to cause undue reversion of $P_2O_5$, of making mixed fertilizers having a high nitrate-nitrogen content relative to the ammonia-nitrogen content, which decreases the tendency of the fertilizers to make soils acidic, and of transporting and utilizing the liquid compositions without material difficulties arising from a solid phase salting out, solutions of sodium nitrate and ammonium nitrate in ammoniacal liquids (either aqua ammonia, anhydrous liquid ammonia) which are substantially saturated with solid components at temperatures between about −30° C. and 30° C., and particularly at about 0° C. are of especial value. These solutions of ammonium nitrate and sodium nitrate have low vapor pressures and accordingly provide a suitable form for the transportation of large quantities of nitrogen in a highly concentrated condition and simplify the precautions which must be taken to prevent loss of ammonia due to the high vapor pressure of anhydrous liquid ammonia. Thus, the liquid compositions may be transported, stored and handled in closed containers in which the liquid is under its own vapor pressure materially below the vapor pressure of the corresponding anhydrous liquid or aqua ammonia which does not contain dissolved in it the ammonium nitrate and sodium nitrate contained in the liquid compositions of this invention. In some cases the pressure in a container for these compositions may be atmospheric and the vapor pressure of the composition itself constitutes but a portion of the total pressure within the container.

The methods suitable for the preparation of these solutions facilitate putting the sodium nitrate and ammonium nitrate into a form in which they may be moved to the market and provides liquid compositions which, at the usual atmospheric temperature conditions, do not throw down a precipitate of solid material, or if some precipitate should occur at extremely low temperatures, such as may be met with in the winter time, the precipitated solid may be redissolved by a slight warming of the solution.

The use of the compositions of this invention as a means for the transportation, storage, and handling of ammonium nitrate and sodium nitrate obviates the difficulties arising in the marketing of the solid salts caused by the tendency of these solid salts to cake when stored, which frequently necessitates disintegration of the caked mass before it may be utilized. The liquid sodium nitrate-ammonium nitrate-ammonia compositions, on the other hand, may be readily utilized in the production of fertilizer materials containing superphosphate, for example by mixing the liquid with the solid. This mixing may, if desired, be accomplished by spraying the liquid onto the solid material while it is being agitated in a mixing machine. The liquid compositions are suitable for spraying since they may be readily handled without their clogging the sprayer by the formation of solid material from the solution. The use of the liquid permits a thorough dissemination of the ammonium nitrate, sodium nitrate, and ammonia throughout the superphosphate material and the formation of substantially homogeneous fertilizer products having a satisfactory physical condition.

The anhydrous solutions of this invention may be conveniently prepared by treating the desired proportions of dry ammonium nitrate and sodium nitrate with gaseous or liquid anhydrous ammonia. In making aqueous solutions, solutions or slurries of ammonium nitrate and/or sodium nitrate in water may be treated either with aqua, gaseous or liquid anhydrous ammonia, or if desired, solid ammonium nitrate and sodium nitrate may be dissolved in the desired strength of anhydrous liquid or aqua ammonia. Solutions or slurries of ammonium nitrate and sodium nitrate having any desired degree of concentration may be treated with ammonia. Furthermore, this invention permits producing sodium nitrate or ammonium nitrate by neutralizing a sodium carbonate solution with nitric acid or nitrogen oxides or by absorbing ammonia in nitric acid, without necessitating a close control of the degree of neutralization of the solutions in order to obtain a non-acid product such as is required where the solid salts are to be shipped. Where the compositions of this invention are used for the transportation and marketing of sodium nitrate and ammonium nitrate, the solutions in which the ammonia is absorbed may be operated with any desired degree of acidity or the sodium nitrate solution obtained by reacting sodium carbonate with nitric acid or nitrogen oxides may have any desired content of free acid, and the free acid in the mother liquors adhering to the solid salts is neutralized by the ammonia used in making up the ammoniacal solutions of this invention.

The following examples are illustrative of methods for the preparation of the liquid compositions of this invention and their use in the production of fertilizers, but the invention is not limited to these examples or to the particular details described. The amounts of the various materials given in the examples are in parts by weight.

*Example 1.*—An anhydrous solution is prepared by dissolving about 72 parts of solid ammonium nitrate and 5 parts of solid sodium nitrate in 23 parts of liquid anhydrous ammonia. The resulting solution does not salt out at temperatures above about 0° C. It contains approximately 45% nitrogen in the proportions of about 1.37 parts of nitrogen combined as ammonium nitrate and sodium nitrate for each part of nitrogen combined as free ammonia. At 30° C., for example, this solution has a vapor pressure of about 1 atmosphere gauge, as compared with 10.5 atmospheres for liquid anhydrous ammonia at this temperature.

*Example 2.*—An ammonium nitrate-sodium nitrate-ammonia-water composition is prepared by admixing the following ingredients:

(a) 74.2 parts of an ammonium nitrate-water composition containing 60 parts of ammonium nitrate and 14.2 parts water, such as might be obained by evaporating a solution prepared by neutralizing aqueous nitric acid with aqua or gaseous ammonia.

(b) 8.3 parts of a sodium nitrate-water composition containing about 5 parts sodium nitrate and 3.3 parts water, such as might be obtained by evaporating a solution formed by absorbing nitrogen oxides in a solution of sodium carbonate.

(c) 17.5 parts of anhydrous ammonia.

The solution which results does not salt out at temperatures above about 0° C. It contains approximately 36.2% nitrogen, in the proportions of about 1.52 parts of nitrogen combined as ammonium nitrate and sodium nitrate for each part of nitrogen combined as free ammonia. The composition is equivalent to about 5 parts sodium nitrate, 60 parts ammonium nitrate dissolved in 35 parts of 50% aqua ammonia. At 30° C., for example, the solution has a negative gauge pressure of about 0.2 atmosphere as compared with a positive gauge pressure of 2.6 atmospheres for 50% aqua ammonia at this temperature.

*Example 3.*—An anhydrous composition is prepared by dissolving 5 parts of dry sodium nitrate and 70 parts of dry ammonium nitrate in 25 parts of anhydrous ammonia. This solution does not salt out at temperatures above about −15° C. It contains approximately 45.9% nitrogen in the proportion of about 1.23 parts of salt nitrogen to 1 part of free ammonia nitrogen. At 30° C. its vapor pressure is about 1 atmosphere gauge as compared with 10.5 atmospheres for the liquid anhydrous ammonia at this temperature.

100 parts of this solution are then utilized for the preparation of a complete fertilizer mixture by addition thereof in a suitable manner to a mixture containing about 890 parts of superphosphate (18% $P_2O_5$), 160 parts muriate of potash (50% $K_2O$), 163 parts sulfate of ammonia (21% nitrogen), and 687 parts of inert filler. The resulting mixture is in excellent physical condition. It contains about 4% nitrogen (more than half of which is derived from the solution), 8% $P_2O_5$ and 4% $K_2O$. About 16% of the total nitrogen in the mixture is in the nitrate form.

*Example 4.*—A solution having a composition approximately the same as that given in Example 2 above is prepared and utilized for the production of a complete fertilizer mixture as follows: 147 parts of the solution are added in a suitable manner to a mixture containing about 890 parts of superphosphate (18% $P_2O_5$), 127 parts sulfate of ammonia (21% nitrogen), 160 parts sulfate of potash (50% $K_2O$), and 676 parts of sand. The resulting mixture is in very good condition. It contains about 4% nitrogen (about 2/3rds of which was obtained from the solution), 8% $P_2O_5$ and 4% $K_2O$. Approximately 20% of the total nitrogen in the mixture is in the nitrate form.

If desired additional materials, such as calcium nitrate, ammonium sulfate, ammonium phosphate, urea, etc., or any two or more of these materials, which in themselves are valuable fertilizers, may be incorporated with the ammoniacal solutions of this invention before they are added to the phosphate material, or these materials may be incorporated with a phosphate material before or simultaneously with the treatment with the ammoniacal solution. In preparing the fertilizers of this invention, the several solid ingredients may, if desired, be introduced into a mixer and simultaneously admixed therein with the ammoniacal solution, which is preferably supplied as a spray to the materials while they are being admixed. Further, if desired, the superphosphate material may be ammoniated with the ammoniacal solution and this ammoniated material used as a fertilizer itself or it may be admixed with one or more additional fertilizer ingredients.

When in this specification and claims reference is made to an aqua ammonia of a specified strength, reference is had to a solution of ammonia in water containing the indicated percentage of ammonia. The phrase "saturated with solid components" at a given temperature, as used herein, refers to solutions of ammonium nitrate and sodium nitrate from which a solid material containing, for example sodium nitrate and/or ammonium nitrate (either of which may be in the solid form in combination with other components of the solution, particularly the ammonia) separates out from the solution when it is cooled at a lower temperature.

This application is in part a continuation of our copending application Serial No. 701,724, filed December 9, 1933.

We claim:

1. As a new composition of matter a solution of sodium nitrate and ammonium nitrate in an ammoniacal solvent, which solvent contains substantial proportions of ammonia, said solution containing the ammonium nitrate and sodium nirtate in a proportion in which the total amount of the ammonium nitrate and sodium nitrate dissolved therein is sufficiently greater than the amount of ammonium nitrate soluble in said ammoniacal solvent that the ratio of salt nitrogen to free ammonia nitrogen in said solution is increased over that of a solution of ammonium nitrate alone in said ammoniacal solvent which has the same salting out temperature as said solution of ammonium nitrate and sodium nitrate.

2. As a new composition of matter a solution in an ammoniacal solvent, which solvent contains substantial proportions of ammonia, of sodium nitrate and ammonium nitrate from which a solid phase salts out at a temperature between about −30° C. and about 30° C., said solution containing the ammonium nitrate and sodium nitrate in a proportion in which the total amount of the ammonium nitrate and sodium nitrate dissolved therein is sufficiently greater than the amount of ammonium nitrate soluble in said ammoniacal solvent that the ratio of salt nitrogen to free ammonia nitrogen in said solution is increased over that of a solution of ammonium nitrate alone in said ammoniacal solvent which has the same salting out temperature as said solution of ammonium nitrate and sodium nitrate.

3. As a new composition of matter a solution in an ammoniacal solvent, which solvent contains substantial proportions of ammonia, of sodium nitrate and ammonium nitrate from which a solid phase salts out at a temperature of about 0° C., said solution containing the ammonium nitrate and sodium nitrate in a proportion in which the total amount of the ammonium nitrate and sodium nitrate dissolved therein is sufficiently greater than the amount of ammonium nitrate soluble in said ammoniacal solvent that the ratio of salt nitrogen to free ammonia nitrogen in said solution is increased over that of a solution of ammonium nitrate alone in said ammoniacal solvent which has the same salting out temperature as said solution of ammonium nitrate and sodium nitrate.

4. As a new composition of matter a solution of sodium nitrate and ammonium nitrate in aqua ammonia of about 50% to 75% strength, said solution containing the ammonium nitrate and sodium nitrate in a proportion in which the total amount of the ammonium nitrate and sodium nitrate dissolved therein is sufficiently greater than the amount of ammonium nitrate soluble in said aqua ammonia that the ratio of salt nitrogen to free ammonia nitrogen in said solution is increased over that of a solution of ammonium nitrate alone in said aqua ammonia which has the same salting out temperature as said solution of ammonium nitrate and sodium nitrate.

5. The process for producing a fertilizer which comprises treating a solid acidic fertilizer material with a solution of sodium nitrate and ammonium nitrate in an ammoniacal solvent, which solvent contains substantial proportions of ammonia, said solution containing the ammonium nitrate and sodium nitrate in a proportion in which the total amount of the ammonium nitrate and sodium nitrate dissolved therein is sufficiently greater than the amount of ammonium nitrate soluble in said ammoniacal solvent that the ratio of salt nitrogen to free ammonia nitrogen in said solution is increased over that of a solution of ammonium nitrate alone in said ammoniacal solvent which has the same salting out temperature as said solution of ammonium nitrate and sodium nitrate.

6. The process for producing a fertilizer which comprises treating a solid acidic fertilizer material with a solution in an ammoniacal solvent, which solvent contains substantial proportions of ammonia, of sodium nitrate and ammonium nitrate from which a solid phase salts out of the solution at a temperature between about −30° C. and about 30° C., said solution containing the ammonium nitrate and sodium nitrate in a proportion in which the total amount of the ammonium nitrate and sodium nitrate dissolved therein is sufficiently greater than the amount of ammonium nitrate soluble in said ammoniacal solvent that the ratio of salt nitrogen to free ammonia nitrogen in said solution is increased over that of a solution of ammonium nitrate alone in said ammoniacal solvent which has the same salting out temperature as said solution of ammonium nitrate and sodium nitrate.

7. The process for producing a fertilizer which comprises treating a solid acidic fertilizer material with a solution of sodium nitrate and ammonium nitrate in aqua ammonia of about 50% to 75% strength, said solution containing the ammonium nitrate and sodium nitrate in a proportion in which the total amount of the ammonium nitrate and sodium nitrate dissolved therein is sufficiently greater than the amount of ammonium nitrate soluble in said ammoniacal solvent that the ratio of salt nitrogen to free ammonia nitrogen in said solution is increased over that of a solution of ammonium nitrate alone in said ammoniacal solvent which has the same salting out temperature as said solution of ammonium nitrate and sodium nitrate.

8. As a new composition of matter, a solution of sodium nitrate and ammonium nitrate in an ammoniacal solvent, which solvent contains substantial proportions of ammonia, said solution containing sodium nitrate in amount less than about 10% of the combined weight of sodium nitrate and ammonium nitrate in the solution and an amount of sodium nitrate and ammonium nitrate such that the solution salts out a solid phase at a temperature between about $-30°$ C. and about $30°$ C.

9. The process for producing a fertilizer which comprises treating a superphosphate material with a solution of sodium nitrate and ammonium nitrate in an ammoniacal solvent, which solvent contains substantial proportions of ammonia, said solution containing sodium nitrate in amount less than about 10% of the combined weight of sodium nitrate and ammonium nitrate in the solution and an amount of sodium nitrate and ammonium nitrate such that the solution salts out a solid phase at a temperature between about $-30°$ C. and about $30°$ C.

WALTER H. KNISKERN.
CHARLES K. LAWRENCE.